United States Patent [19]
Lieb et al.

[11] Patent Number: 6,113,109
[45] Date of Patent: Sep. 5, 2000

[54] EXPANDED GRAPHITE GASKET WITH BEADED STRESS RISERS

[75] Inventors: Matthew Jeremy Lieb, Northbrook; Thomas J. Molitor, Arlington Heights, both of Ill.

[73] Assignee: Fel-Pro Incorporated, Skokie, Ill.

[21] Appl. No.: 09/063,254

[22] Filed: Apr. 20, 1998

[51] Int. Cl.[7] .................................................. F16J 15/14
[52] U.S. Cl. .......................... 277/590; 277/592; 277/594; 277/596; 277/938
[58] Field of Search .................................. 277/592, 594, 277/596, 593, 938

[56] References Cited

U.S. PATENT DOCUMENTS

| | | |
|---|---|---|
| 3,477,867 | 11/1969 | Hillier . |
| 3,737,169 | 6/1973 | Glynn . |
| 3,794,333 | 2/1974 | Czernik et al. . |
| 3,930,656 | 1/1976 | Jelinek . |
| 4,272,085 | 6/1981 | Fujikawa et al. . |
| 4,317,576 | 3/1982 | Barker et al. . |
| 4,397,472 | 8/1983 | Czernik . |
| 4,428,593 | 1/1984 | Pearlstein . |
| 4,434,989 | 3/1984 | Beyer et al. . |
| 4,465,287 | 8/1984 | Bindel et al. .............................. 277/596 |
| 4,519,619 | 5/1985 | Doyle ....................................... 277/596 |
| 4,625,979 | 12/1986 | Inciong . |
| 4,659,410 | 4/1987 | McDowell et al. ...................... 156/277 |
| 4,721,315 | 1/1988 | Ueta . |
| 4,743,421 | 5/1988 | McDowell et al. ...................... 264/129 |
| 4,828,275 | 5/1989 | Udagawa . |
| 4,993,723 | 2/1991 | Sroka et al. . |
| 5,121,933 | 6/1992 | Silvers . |
| 5,197,747 | 3/1993 | Ueta et al. . |
| 5,226,662 | 7/1993 | Justus ....................................... 277/594 |
| 5,236,205 | 8/1993 | Chen et al. .............................. 277/596 |
| 5,280,928 | 1/1994 | Ueta et al. . |
| 5,322,299 | 6/1994 | Terai . |

*Primary Examiner*—Anthony Knight
*Assistant Examiner*—Alison K. Pickard
*Attorney, Agent, or Firm*—Brinks Hofer Gilson & Lione

[57] ABSTRACT

A cylinder head gasket has at least one combustion opening, a central metallic core and an expanded graphite facing layer on each side of the core. A stress rising bead is disposed on at least one of the graphite layers encircling each combustion opening for sealing around the combustion openings.

14 Claims, 2 Drawing Sheets

EXPANDED GRAPHITE GASKET WITH BEADED STRESS RISERS

BACKGROUND OF THE INVENTION

Conventional cylinder head gaskets generally include armoring around the combustion openings. For example, U.S. Pat. No. 4,434,989 to Beyer et al. discloses a gasket with a U-shaped armor framing the combustion opening. Many such gaskets also usually employ a steel core and facing layers thereon. The core may be a solid core, in which event the facing layers are adhesively bonded to the core. Alternatively, the core may be a perforated steel core, in which case the facing layers are usually mechanically clinched to the core. The zone around the cylinder bore and in contact with the combustion gases usually consists of a steel or stainless steel wrap or armor for sealing the joint between the engine head and block and for protecting the facing layers, One purpose of the armor wrap is to concentrate stresses at the combustion openings in the zones between the engine head and block, thereby to seal against the escape of high temperature and pressure combustion gases. The use of the armor wraps has also been viewed as critical to protecting gasket facings from the effects of high temperature, and is particularly important for facings employing temperature sensitive materials such as rubbers which can burn and char, and which can degrade at the high temperatures at which internal combustion engines operate.

It would be desirable for cost savings and for other reasons to avoid the use of armor wraps at combustion openings if other ways i:o provide the necessary stress concentration could be found to provide effective sealing around the combustion openings.

SUMMARY OF THE INVENTION

In accordance with the present invention, an improved cylinder head gasket for an internal combustion engine is provided The gasket defines at least one combustion opening and a plurality of bolt holes and fluid passageways. The gasket comprises a main body portion comprising a central metallic core having first and second main surfaces and an expanded graphite facing layer on each of the main surfaces, the main bandy defining each combustion opening, and a stress rising bead disposed on at least one of the expanded graphite layers and encircling each combustion opening, each bead projecting, respectively, vertically beyond the facing) layer on which it is disposed for contacting, respectively one of the head and block for sealing at and around each combustion opening.

In one form, the stress rising beads are of generally uniform heights and widths throughout their entire lengths. In another form, tie stress rising beads vary in height along their lengths in accordance with their distances from the bolt holes. In yet another form, the stress rising beads vary in radial width along their lengths in accordance with their distances from the bolt holes.

Further objects, features and advantages of the present invention will become apparent from the following description and drawing,.

DETAILED DESCRIPTION OF THE DRAWINGS AND PREFERRED EMBODIMENTS OF THE INVENTION

Figure 1:
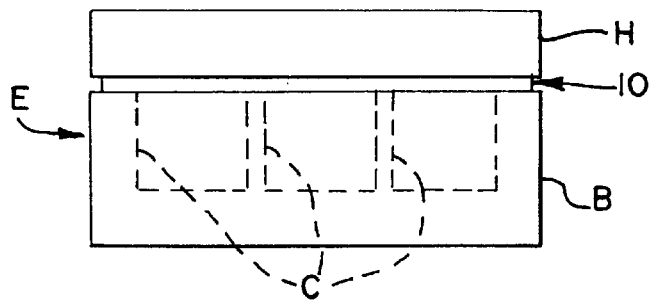
FIG. 1 is a schematic view of an internal combustion engine in which a gasket of the present invention is adapted to be used.
Figure 2:
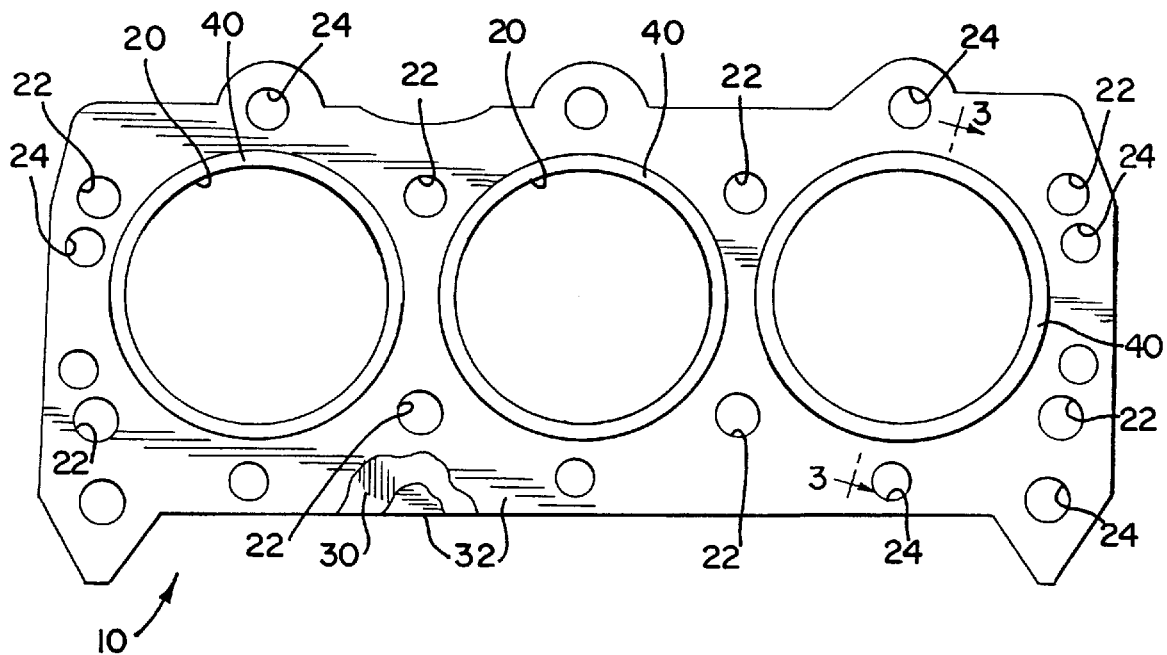
FIG. 2 is a plan view of a gasket made in accordance with the present invention.

Referring now to the drawings, a cylinder head gasket 10 in accordance with the present invention is adapted to be positioned between an engine head H and an engine block B of an internal combustion engine E. Engine E defines at least one, and most usually a plurality of combustion cylinders C. The joint between the head H and block B is adapted to be sealed by cylinder head gasket 10 to prevent combustion gases generated in the cylinders from escaping from the cylinders and from between the head and block, Gasket 10 is of a configuration suitable for the particular engine with which it is to be used. Gasket 10 defines a plurality of openings, including combustion openings 20, fluid flow passageways, such as oil and water passageways 24, and bolt holes 22. In the preferred embodiment, there are no armor wraps around the combustion openings.

Gasket 10 comprises main gasket body 28 having a central core such as a metallic core 30 having upper and lower main surfaces and a pair of facing layers 32, one on each of the main surfaces. Core 30 may be a solid steel core. Facing layers 32 may be expanded graphite layer.; which are adhesively bonded to the core 301 as with an adhesive conventionally used for such purposes.

Although the dimensions and materials of the layers of the cylinder head gasket 10 may vary depending upon the particular engine and application, in a preferred embodiment a gasket having a cold rolled steel core 30 about 0.015 inch in thickness may be used with compressed expanded graphite facing layers 30, each of which is about 0.010 inch in thickness.

A suitable compressed flexible, expanded graphite material is available at a density of about 70 pounds per cubic foot. It is essentially devoid of binders, resins, fillers and additives. Such material is formed into sheets, then die-cut into the desired shape and then is further compressed to the desired density. Thus, 70 pound per cubic foot sheet material may be cut into suitable gasket facing layer sheets 32 for assembly with the metallic core 30, later to be further compressed, if desired, and laminated with the metallic core 30.

Figure 3:
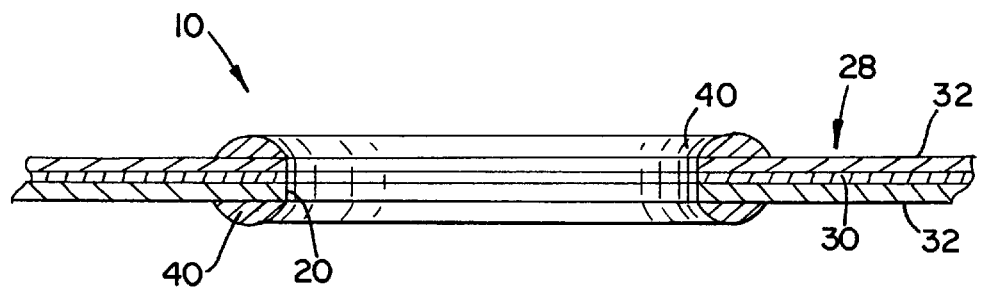
FIG. 3 is a cross-sectional view taken substantially along line 3–3 of FIG. 2.

Referring now to FIG. 3, the combustion openings 20 are encircled and circumscribed by a continuous stress riser bead 40 which is formed in situ. Bead 40 can be formed on one facing layer or, as illustrated in the preferred embodiment, may be formed on both facing layers. One bead 40 faces and projects upwardly and the other faces and projects downwardly, so that when one engages the confronting head flange or surface, the other will engage the confronting block flange or surface, thereby to form an effective combustion seal between the head H and the block B. The high temperature resistance characteristics of compressed expanded graphite, unlike the characteristics of most rubber-based facing layers, will prevent the degradation of the graphite facing layer immediately adjacent the combustion openings 20, and, thereby, will make it possible to use non-wrapped combustion opening constructions. Although it is preferred th;at the stress rising beads 40 should terminate at the very edge of the combustion opening (as is illustrated by FIG. 3), under appropriate circumstances the beads 40 may terminate at points slightly outwardly of the combustion openings 20.

In a preferred embodiment, the formed in situ beads may be formed of a screen printable epoxy nitrile thermoset polymeric material, although it will be apparent that other suitable temperature resistant materials, such as, among others, epoxies and fiber-filled thermosetting polymer, may be used. The bead materials should also be sufficiently crush-resistant so that at the stresses applied to effect a seal, and at the temperatures to which the beads 40 are exposed, typically from −30° F. to 600° F., the materials will not extrude or degrade in a manner which will affect their functioning appropriately. The use of beads 40, as illustrated and described, makes it possible to vary contact stresses around a combustion opening in a cost effective way, all while avoiding the need for armor wraps.

With core 30 and facing layer 32 thicknesses as described above, bead dimensions of about 0.004 inch in height and 0.120 inch in radial dimension with a crown generally as illustrated may be used. In a preferred embodiment, the radial width of the stress rising bead 40 is at least five, and more preferably at least ten, times the vertical height of the bead at its greatest height in thickness. In the preferred embodiment, the heights and radial widths of the beads 40 are generally uniform through the entire lengths of the beads.

It is known that the stresses applied around combustion openings vary with a number of factors, including the distance between the bolts clamping the engine parts together and the point at which the stress is measured. Thus, in the immediate vicinity of the clamping bolts, the stress is the greatest. At a location intermediate the clamping bolts, the stress tends to be the lowest.

Figure 4:
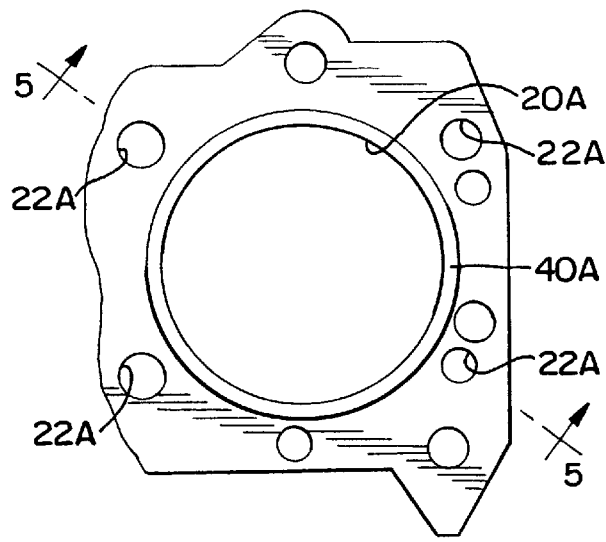
FIG. 4 is a fragmentary illustrative view of a further embodiment of the present invention.
Figure 5:
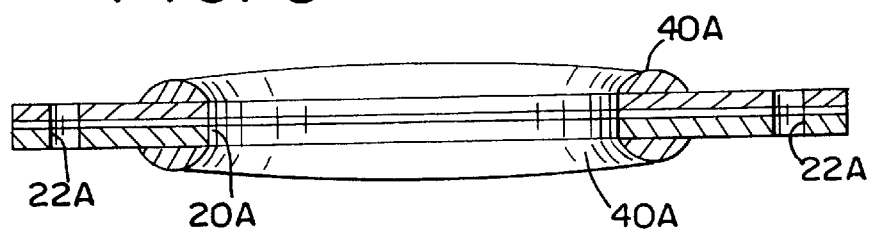
FIG. 5 is a cross-sectional view of the embodiment of FIG. 4 taken substantially along line 5—5 of FIG. 4; and FIG, 6 is a plan view of a further embodiment of the present invention.
Figure 6:
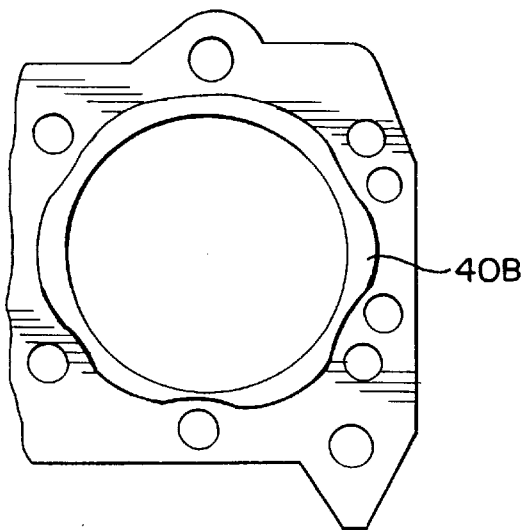

In accordance with the present invention, the thickness (vertical height) of the stress rising beads may increase as a function of the distance from the clamping bolts, thereby to even out the stresses applied around the combustion opening. This is illustrated schematically by FIGS. 4 and 5 where, for purposes of illustration, there are two bolt holes 22A for a combustion opening 20A. The stress rising beads 40A have a first height adjacent the bolt holes 22A which increases gradually (as illustrated by FIG. 5) to its greatest height at a location which is farthest from the bolt holes 22A. Similarly, the radial width of the stress rising bead 40B may be varied, as illustrated by FIG. 6, so that the radial width of bead 40B between positions spaced away from the bolt holes may be wider to help increase the sealing load at those locations. Combinations of varying heights and radial widths may be used, all of which are relatively inexpensive to accomplish with screen printed or computer controlled deposited bead materials which cure to act as stress risers. A method of making a gasket in which an epoxy resin formulation is deposited by a silk screening process is disclosed in U.S. Pat. No. 3,794,333, hereby incorporated by reference. The width and height of the bead at a given point along the length of the stress rising bead may vary, as stated, in accordance with the distances of the point from the bolt holes. The bead height and/or width may also vary along the length of the stress rising bead in relation to head and block deflection.

It will be apparent from the foregoing that modifications may be made without departing from the spirit and scope of the present invention. Accordingly, we do not intend to be limited except in accordance with the appended claims.

We claim:

1. A cylinder head gasket for an internal combustion engine adapted to be positioned between an engine head and an engine block, and for sealing a combustion cylinder, said gasket defining at least one combustion opening and a plurality of bolt holes and fluid passageways, said gasket assembly comprising:
   a) a main body portion comprising a central metallic core having first and second main surfaces and an expanded graphite facing layer on each of said main surfaces,
   b) said main body defining each said combustion opening; and
   c) a stress rising bead disposed on at least one of said expanded graphite layers, and encircling each said combustion opening, each said bead projecting, respectively, vertically beyond the facing layer on which it is disposed for contacting, respectively, one of said head and block for sealing around each said combustion opening;
   wherein said main body portion does not include an armor wrap in each said combustion opening.

2. A cylinder head gasket assembly in accordance with claim 1, and wherein said stress rising beads each have a length, and said stress rising beads are of generally uniform heights and widths throughout their entire lengths.

3. A cylinder head gasket assembly in accordance with claim 1, and wherein said stress rising beads each have a length, and said stress rising beads vary in height along their lengths, the height at a given point along the length being a function of a distance from said point to the bolt holes.

4. A cylinder head gasket assembly in accordance with claim 1, and wherein said stress rising beads each have a length, and said stress rising beads vary in radial width along their lengths, the width at a given point along the length being a function of a distance from said point to the bolt holes.

5. A cylinder head gasket assembly in accordance with claim 1, and wherein said stress rising beads each have a length, and said stress rising beads vary in radial width along their lengths in relation to head and block deflection.

6. A cylinder head gasket assembly in accordance with claim 1, and wherein said stress rising beads each have a length, and said stress rising beads vary in height and radial width along their lengths, the height and width at a given point along the length being a function of a distance from said point to the bolt holes.

7. A cylinder head gasket assembly in accordance with claim 1, said stress rising beads having a plurality of heights and radial widths, wherein at least one of the heights is greater than or equal to all other heights, and wherein the radial widths of said stress rising beads are at least five times said height that is greater than or equal to all other heights.

8. A cylinder head gasket assembly in accordance with claim 1, wherein said stress rising beads have a plurality of heights and radial widths, at least one of the heights is greater than or equal to all other heights, and the radial widths of said stress rising beads are at least ten times said height that is greater than or equal to all other heights.

9. A cylinder head gasket assembly in accordance with claim 1, and wherein said stress rising beads are formed of a thermoset polymeric material.

10. A cylinder head gasket assembly in accordance with claim 1, and wherein said stress rising beads are formed on each of said expanded graphite layers.

11. The cylinder head gasket assembly in accordance with claim 9, and wherein the thermoset polymeric material comprises epoxy nitrile thermoset polymeric material.

12. The cylinder head gasket assembly in accordance with claim 9, and wherein the thermoset polymeric material comprises an epoxy.

13. The cylinder head gasket assembly in accordance with claim 9, and wherein the thermoset polymeric material comprises fiber filled thermosetting polymers.

14. A cylinder head gasket for an internal combustion engine adapted to be positioned between an engine head and an engine block, and for sealing a combustion cylinder, said gasket defining at least one combustion opening and a plurality of bolt holes and fluid passageways, said gasket assembly consisting essentially of:

a) a main body portion comprising a central metallic core having first and second main surfaces and an expanded graphite facing layer on each of said main surfaces, b) said main body defining each said combustion opening; and c) a stress rising bead disposed on at least one of said expanded graphite layers, and encircling each said combustion opening, each said bead projecting, respectively, vertically beyond the facing layer on which it is disposed for contacting, respectively, one of said head and block for sealing around each said combustion opening.

* * * * *